3,251,218
APPARATUS FOR PRESSURE TESTING THE POROSITY AND STRENGTH OF CARTONS AND CONTAINERS
Paul F. Russell, Battle Creek, Mich.
(Swamp Pike Road, R.D. 1, Gilbertsville, Pa.)
Filed Feb. 4, 1963, Ser. No. 255,939
5 Claims. (Cl. 73—52)

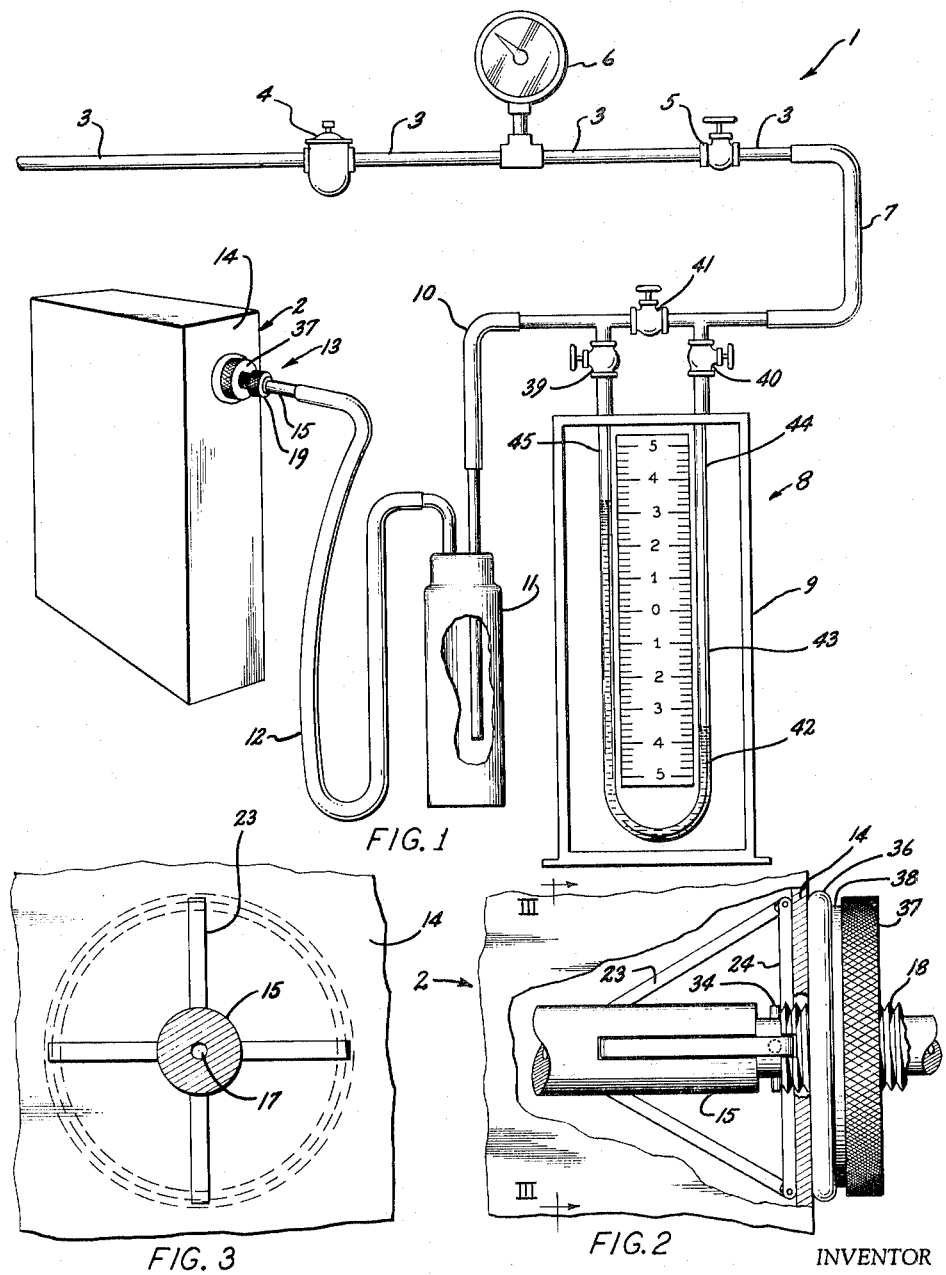

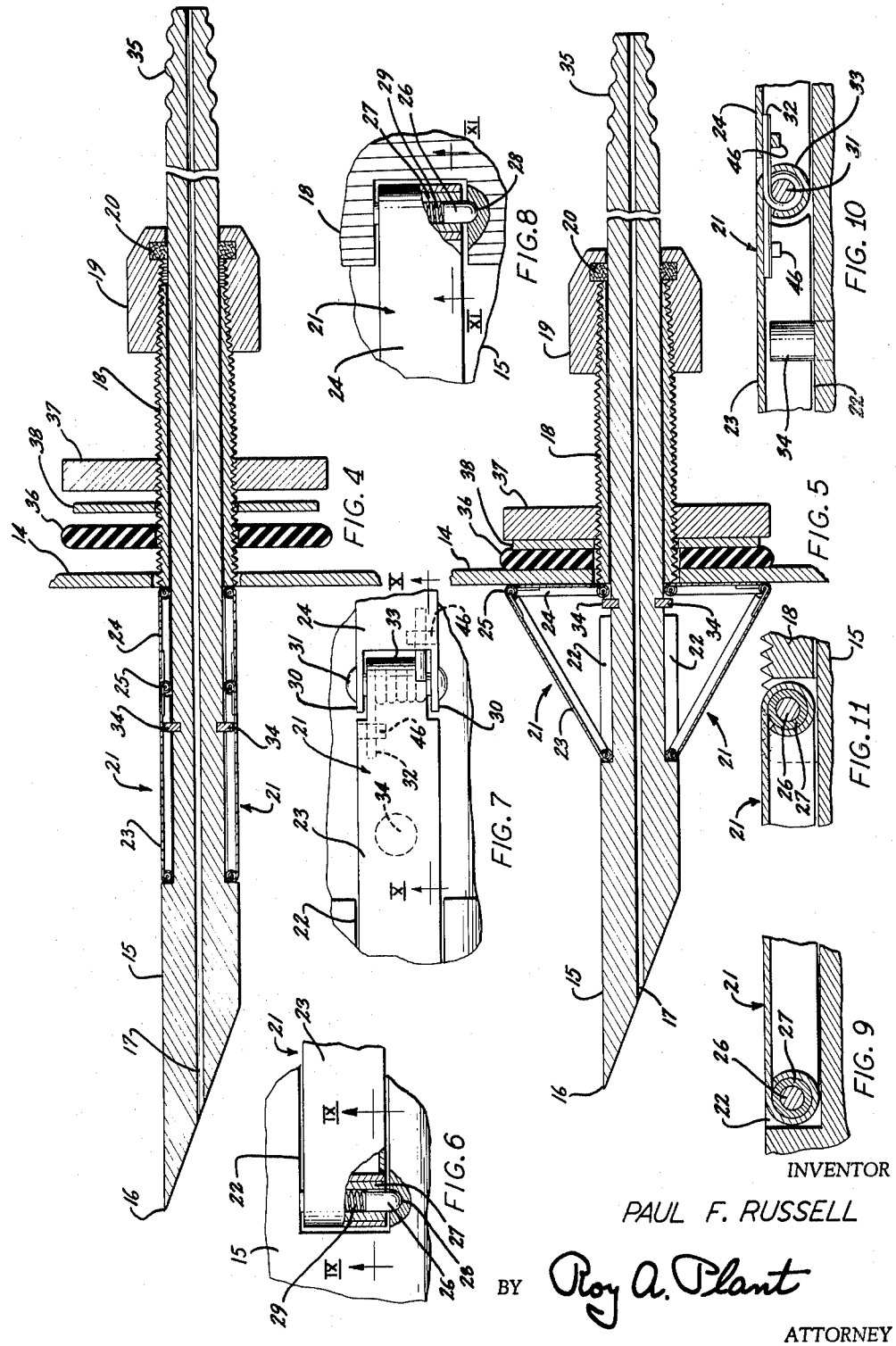

The present invention deals broadly with testing equipment, and more particularly with measuring cartons or containers for gas tightness and in some cases for bursting strength.

Testing of sheet materials for leakage or passage of air through a given area of same has been carried out quite successfully with complex and highly expensive equipment. Cardboard cartons and plastic bags, on the other hand, have been tested for air leakage in various ways such as by imersing the sealed package in water and detecting the leaks by visually observing the bubbles of air emitted from the package, if same leaks. This procedure is obviously messy, very crude, and offers only a very rough, qualitative evaluation. Another testing procedure is to measure the package with a ruler or caliper for damaged corners, defective folds, et cetera, and compare same with a predetermined standard. This does not provide the necessary quantitative evaluation of defects which will affect shelf life, or the detrimental effect of the defect on salability of the product, or the further effect on such package of handling, climate, type or defect, or even the extensiveness of the defect.

Another test practice involves the determination of the moisture vapor transmission (M.V.T.) rate for a packaged commodity in accordance with acceptable procedures and practices which usually require expensive equipment, sample preparation, and a test period of 48 to 72 hours, or more. This in turn will involve holding up the packaged goods for the noted period with use of warehouse space while waiting for the completion of the test and a decision as to disposition of the goods. The determination of shelf life of a packaged commodity has normally involved sampling or field testing of the goods under climatic conditions to which the item will be subjected in the test area. This procedure is expensive and time consuming, and offers mostly post-mortem data. In other words, this practice takes so long that corrective procedures and controls at the time and point of manufacture are impossible.

A further testing procedure involves visually examining the packaging materials for flaws such as "pin holes" and counting same for a predetermined area. This is a very crude evaluation at best and does not take into consideration further variations which may come into being during formation, filling and sealing of the cardboard carton. Such evaluation is also subject to human strain and errors in judgment. Another test is to determine the seal or bond strength of the package, which is time consuming and requires not only sample protection, but the use of highly specialized and expensive equipment. It was a recognition of these problems and difficulties in the cardboard carton and container testing field which led to the conception and development of the present invention.

Accordingly, among the objects of the present invention is the provision of a special type of apparatus useable to test cardboard cartons or containers with and without liner bags or overwrap to determine whether they are satisfactorily tight, and the limits of such tightness.

Another object is to provide a testing device for making a rapid estimate of the moisture vapor transmission (M.V.T.) rate of the packaged commodity by a measurable indication of the pressure and/or flow rate of gaseous fluid, which will escape from the package during a predetermined time interval while a packaged commodity is subjected to controlled gaseous fluid pressure above atmospheric pressure.

Another object is to provide a testing device for predetermining the expected shelf-life or salability of the packaged commodity under various climatic conditions which may be affected due to physical defects in the manufacture or forming of the packaging container by a measurable indication of the pressure and/or flow rate of gaseous fluid, which will escape from the closed container during a predetermined time interval while subjected to controlled gaseous fluid pressure above atmospheric pressure.

Another object of the invention is to provide a testing device for predetermining the expected shelf-life or salability life of the packaged commodity with various types of defects, as well as the extensiveness of the defects either in the manufacture of the carton or container, or in the packaging of the commodity, by a measurable indication of the pressure and/or flow rate of gaseous fluid, which will escape from the closed cardboard carton or container during a predetermined time interval while subjected to controlled gaseous fluid pressure above atmospheric pressure.

Another object is to provide a testing device for determining the strength of seals, bonds, folds, or flaps of closed and sealed cardboard cartons using adhesives such as glue or thermo-plastic adhesives sealable with heat and pressure in the forming and closing of the carton of packaged commodity, and their relation to the strength requirements for a particular commodity by a measurable indication of the pressure of air or gas which has been introduced into the package quickly, or even during a predetermined time interval, while subjected to controlled air pressure above atmospheric pressure in making such strength test of the sealed cardboard carton.

A further object is to provide a testing device for determining the internal bursting strength of the whole package component, or its weakest structural point or area by a measurable indication of the pressure of air or gas introduced into the package during a predetermined time interval while subjected to controlled gaseous pressure above atmospheric pressure.

Another object of the present invention is to provide a testing device for determining tightness of seals, folds, bonds or flaps of packages using adhesives such as glue or thermo-plastic adhesives sealable with heat and pressure in the sealing of the packaged commodity by a measurable indication of the pressure of air or gas which has been introduced into the package quickly, or even during a predetermined time interval, while subjected to controlled gas pressure above atmospheric pressure in making such tightness test of the various parts of the package.

A further object of the present invention is the provision of a highly simplified apparatus for testing sealed cartons or containers of commodities to determine the quality as well as gas tightness of the sealed cartons.

A further object is to provide an apparatus for testing the air tightness of sealed cardboard or other substantially non-metal cartons of commodities by means of a hollow piercing probe which can be pushed through a panel of the carton and then tightened in place to resist leakage around the pierced point of the carton and yet make possible the delivery of air or gas into the carton in measured amounts, and then measuring the leakage or rate of leakage of such gas under pressure in the carton under predetermined conditions for comparison with a predetermined leakage chart which will indicate such things as porosity of the carton, leakage through the flaps, et cetera, and in general will thus be a guide to the shelf-life of the packaged commodity whose characteristics are known.

Still further objects and advantages of the invention will appear as the description proceeds.

To the accomplishment of the foregoing and related ends the invention, then, consists of the means hereinafter fully described and particularly pointed out in the claims, the annexed drawings and the following description setting forth in detail certain means and modes of carrying out the invention, such disclosed means and modes illustrating, however, but several of the various ways in which the principle of the invention may be used.

In the annexed drawings:

FIGURE 1 diagrammatically shows a preferred embodiment of one form of testing apparatus which may be used in accordance with the present invention.

FIGURE 2 shows a fragmentary enlarged view of a portion of the probe inserted into the carton as illustrated in FIGURE 5.

FIGURE 3 is a cross sectional view as taken along the line III—III of FIGURE 2, looking in the direction of the arrows.

FIGURE 4 shows a longitudinal section of the probe portion of the assembly when pushed through a wall of a carton, and the parts not yet tightened to seal the opening in the carton through which the probe extends.

FIGURE 5 is a longitudinal section similar to FIGURE 4 but showing the assembly tightened in place to seal the carton opening through which the probe extends.

FIGURE 6 shows an enlarged fragmentary sectional top view of the innermost hinge of one of the hinged jackknife struts of the probe.

FIGURE 7 is an enlarged fragmentary top view of the center hinge of one of the jackknife struts of the probe in the same position as shown in FIGURE 4.

FIGURE 8 shows a fragmentary sectional top view of one of the hinges of the jackknife struts with said hinge being adjacent the carton wall and substantially the same as the one shown in FIGURE 6.

FIGURE 9 is a fragmentary sectional view as taken along line IX—IX of FIGURE 6, looking in the direction of the arrows.

FIGURE 10 is a fragmentary sectional view as taken along the line X—X of FIGURE 7, looking in the direction of the arrows.

FIGURE 11 is a fragmentary sectional view as taken along the line XI—XI of FIGURE 8, looking in the direction of the arrows.

Referring more particularly to FIGURE 1, the overall testing assembly 1 is shown as connected to a cardboard carton 2 which is to be tested, for instance, for air tightness and hence shelf life of goods spoilable by air leakage. This assembly 1 is connected by pipe 3 to a suitable source of gas or air pressure (not shown) through an adjustable pressure regulator 4 to a shut-off valve 5 with a pressure gauge 6 which shows the gas pressure being delivered through pressure regulator 4. A connector 7 which, if desired, may be in the form of an airtight flexible hose, joins pipe 3 to a testing apparatus 8 which may be in the form of a manometer 9 or any other gas pressure or gas flow measuring device which may be of the bellows type, revolving drum type, rotary gas type, rotameter, or the like, and it is intended that the showing be considered as diagrammatically indicating suitable testing apparatus in general.

From the testing apparatus 8 the air is delivered through a tube 10, which preferably is in the form of a flexible hose or tubing, to a water trap 11 which in turn is connected by means of a tube 12, which is preferably in the form of a flexible airtight hose or tubing, to a piercing probe assembly 13 which is connectable, as will be hereinafter described, to a cardboard carton 2, or other non-metal container, which is to be tested for airtightness or the like.

Referring more particularly to FIGURES 4 and 5 it will be noted that the piercing probe assembly 13 has been pushed through wall 14, FIGURE 1, of cardboard carton 2 and is ready to be tightened in place as shown in FIGURE 5.

The piercing probe assembly 13 has as part of same a piercing probe 15 of generally cylindrical shape with the forward end of same having a sharp pointed tip 16 and with that end of the probe 15 preferably being of a tapered shape as shown. This piercing probe is also provided with a substantially central passage 17 full length of same for a purpose to be hereinafter set forth. Slidably mounted on piercing probe 15 is a threaded sleeve 18 carrying at its rear end a packing nut or packing gland 19 which in turn carries packing 20 such that when packing nut 19 is tightened on the end of threaded sleeve 18 the packing 20 will grip and hold piercing probe 15 and threaded sleeve 18 substantially fixed relative to each other and at the same time seal and make an airtight joint between said threaded sleeve 18 and the piercing probe 15.

The piercing probe assembly 13, as sectionally shown in FIGURES 4 and 5, is provided with jackknife struts 21 of which four are preferably used as shown. The piercing probe 15 is provided with grooves 22 for the reception of one end portion of the jackknife struts 21 as shown more particularly in FIGURES 5, 6, 7 and 9. These grooves 22, as shown more particularly in FIGURES 5 and 7, are relatively short so that the piercing probe 15 can be pulled back as shown in FIGURE 5 without interfering with the tightening and sealing of the assembly on the carton wall 14.

The jackknife struts 21, as shown in the assembly views FIGURES 4 and 5, have an inner link 23 and an outer link 24 connected together by a hinge 25 and with the inner link 23 being longer than the outer link so as to facilitate jackknifing and bracing of the assembly in its tightened position as shown in FIGURE 5. The inner end of inner link 23 is pivotally mounted in the inner end of groove 22 of piercing probe 15. In this connection, referring to FIGURE 6, this pivoted end of inner link 23 is shown in enlarged detail with a pivot pin 26 in a pivot bearing 27 in the end of inner link 23. Piercing probe 15 is provided with bearing recesses 28 in the sides of groove 22 of piercing probe 15.

To facilitate assembly with the center hinge 25 in operating position, the pivot pin 26 may be in the form of two short round-ended cylindrical members fitting in pivot bearing 27 of inner link 23 and there can be a resilient member such as a spring 29 between these pivot pin end members in order that same can be compressed so as to pass down into groove 22 and then when in position snap into bearing recesses 28 of piercing probe 15 to fasten the pivot in fixed pivotal position. The other end of the jackknife struts as shown in FIGURE 8 may be provided with a like construction pivot wherein the outer end of outer link 24 is connected to threaded sleeve 18 for pivoting as shown in FIGURE 5.

The adjacent ends of inner link 23 and outer link 24 are joined by means of a hinge 25 as shown in detail in FIGURES 7 and 10. Outer link 24 is provided with a pair of ears 30 with a pivot pin 31 extending through same. A coiled tension spring 32 fits around pivot pin 31 and provides a mild tension normally exerting pressure to force the jackknife struts 21 outward at the hinge 25. This serves the purpose of eliminating the possibility of the jackknife struts 21 resisting starting outward hinging from the position shown in FIGURE 4 to the position shown in FIGURE 5. Inner link 23 is provided with a knuckle 33 which extends around the coil portion of spring 32 and the pivot pin within same. This knuckle 33 is preferably of a size which will fit within the ends of inner and outer links 23 and 24 which are preferably in the form of inwardly opening channels. If desired, the piercing probe 15 may be provided with stop pins 34 to give a little greater rigidity to the assembly when tightened in place on a cardboard carton wall as illustrated in FIG- URE 5. The outer end of piercing probe 15 is preferably provided with grooves 35 of conventional type to facilitate the fastening of the end of tube 12, FIGURE 1, to same under operating conditions.

Mounted on threaded sleeve 18, FIGURES 4 and 5, is a compressible washer 36 which is preferably made of rubber or similar compressible material suitable for sealing the piercing probe assembly in final tightened position on carton 2 as shown in FIGURE 1. A nut 37 threadedly engages the threaded sleeve 18 and may have a knurled outer edge for ease of using if desired. In order to reduce tightening resistance when nut 37 is rotatably tightened against washer 36 as diagrammatically illustrated in FIGURE 5, there is preferably provided a metal washer 38 between washer 36 and nut 37, as shown.

To use the device, the piercing probe assembly 13 with the jackknife struts 21 in compressed position as shown in FIGURE 4 is forced through the side wall 14 of the cardboard carton 2 and then the piercing probe 15 is pulled backward through threaded sleeve 18 with the jackknife struts 21 moving outward to the position shown in FIGURE 5. After tightening nut 19 to anchor probe 15 and sleeve 18 in fixed position relative to each other, nut 37 is then tightened against washers 38 and 36 to form an airtight joint at that point while packing nut 19 and its packing 20 form a seal for air which might escape between piercing probe 15 and threaded sleeve 18. It is also to be noted that any pressure above atmospheric delivered to the inside of the carton tends to force piercing probe 15 outward through threaded sleeve 18 and thus helps to hold the seal with washer 36 tight.

Various testing procedures can be followed with this apparatus for testing the tightness of a sealed cardboard carton 2 with one being as follows:

The pressure regulator 4, FIGURE 1, is adjusted in conventional manner until pressure gauge 6 shows the predetermined testing pressure which is within the capacity of the manometer or the like indicator of leakage out of carton 2. With manometer connecting valves 39 and 40 and manometer actuating valve 41 all open, shut-off valve 5 is opened thus allowing the controlled pressure air or other gas to flow through pipe 3, connector 7, valve 41, tube 10, water trap 11, tube 12, and piercing probe assembly 13 into cardboard carton 2 to which the piercing probe assembly has been connected as previously described. This flow is allowed to continue at a rate in excess of the leakage rate of the cardboard carton until the pressure in cardboard carton 2 substantially reaches the pressure shown on pressure gauge 6. At this point the liquid 42 in the manometer U-tube 43 will be at a like height in the two legs 44 and 45 of the U-tube. With the controlled pressure still on the system the manometer actuating valve 41 is closed and at a predetermined time interval the pressure differential of the manometer liquid 42 in the legs 44 and 45 is noted. It is thus obvious that if there is no change in the liquid level in legs 44 and 45 there has been no leakage to measure, while if there is a gradual change of such liquid level it provides one way of measuring the rate of gas leakage out of the carton. Reference to a table of predetermined leakage values, or shelf-life, et cetera, will show, based on this reading, whether the cardboard carton satisfactorily meets the test. If not satisfactory, then immediate steps can be taken o correct the difficulty. A different approach to this would be to check the time taken to reach a predetermined differential reading of the manometer liquid 42 in the legs 44 and 45 under operating conditions and use same to determine whether the leakage rate is within predetermined limits which would be satisfactory.

Where the test is also for the determination of the weakest part of the cardboard carton, or the carton's bursting point, the testing apparatus 8 is by-passed and not used for this phase of the carton test, although otherwise the apparatus is connected to the cardboard carton as shown in FIGURE 1 and described above in connection with leakage rate determination. In this test the manometer actuating valve 41 is left open, and the pressure regulator 4 is turned down to a pressure below the carton bursting pressure. With shut-off valve 5 open, the pressure in the carton 2 is allowed to build up to the starting pressure shown on pressure gauge 6, and then the pressure may, if desired, be brought up quickly to the bursting point of the carton, although to permit better observation of the carton as the pressure is increased, pressure regulator 4 is gradually and very slowly opened so that the pressure in carton 2 is substantially of the same pressure as shown on pressure gauge 6. As the pressure in the carton builds up the pressure gauge 6 is watched and the reading taken on same when the carton bursts. This gives the bursting pressure, and the portion of the carton where the break occurred is the weakest part of the carton so far as internal bursting pressure is concerned.

When it is desired to remove the piercing probe assembly 13 from the carton 2, for instance at the end of a test project, nuts 19 and 37 are loosened and the piercing probe 15 pushed inward through the threaded sleeve 18 until the piercing probe 15 and the jackknife struts 21 again take the position shown in FIGURE 4, whereupon the whole assembly can be withdrawn from the carton, and, if desired, the hole which has been made in the carton can be sealed with adhesive tape or the like (not shown).

While the invention has been described above in connection with the testing of a cardboard container, it is obvious that same apparatus could be used equally well with a lined carton, an overwrapped carton, and likewise to test for small leaks in bags, plastic containers, pouches and the like. The apparatus described thus fulfills the above enumerated objects of this invention and provides a highly simplified method and apparatus using pressure, pressure differentials, or gaseous fluid flow values between the package to be tested and atmospheric pressure. It is accordingly to be understood that the foregoing illustration and description of preferred embodiments of the invention is not to be taken as limiting the scope of the present invention, so long as the obvious spirit and intent of the invention is carried out.

Other modes of applying the principle of my invention may be employed instead of those explained, change being made as regards the means and methods herein disclosed, provided those stated by any of the following claims or their equivalents be employed.

I therefore particularly point out and distinctly claim as my invention:

1. Apparatus for testing the air permeability of a sealed package in which the package includes a puncturable container wall portion of non-metallic material, comprising in combination a source of gaseous pressure including means regulating the pressure to a value below that which will burst the container;

control valve means connected in series to said source of gaseous pressure;

a piercing probe assembly connected in series to said control valve means and including a piercing probe having means for puncturing said wall portion, said assembly including stop means having radially extensible portions for engaging the interior surface of said wall portion, said stop means including a sleeve mounted on said piercing probe, operating means on said piercing probe connected to said sleeve for extending and retracting said sleeve and operating said extensible portions from the exterior of said container wall portion, manually operable sealing means on said sleeve for engaging the exterior of said wall portion and clamping said wall portion and preventing leakage about said piercing probe, and a testing apparatus connected in series to said source of gaseous pressure and said container, said testing apparatus including control portions interposed between said source of gaseous pressure and said container whereby after the container has been charged to a predetermined pressure, the source of gaseous pressure may be directed to the testing apparatus in opposition to the pressure charge in said container, said testing apparatus including indicia means for ascertaining the relative pressure loss between the initial pressure charge therein and that at the source.

2. An apparatus for testing the gas tightness of a flexible wall non-metal container, which comprises the combination of a piercing probe assembly having a piercing probe adapted for extending part way through a wall of a container to be tested, said piercing probe being hollow and adapted for the passage of a gaseous fluid through same into said container, means for anchoring said piercing probe against the inside of said container and sealing said piercing probe in place with its piercing and gaseous fluid delivering end within said container, a gaseous fluid flow indicating means, means operably connecting in gas tight manner said piercing probe assembly to said indicating means, a pressure regulator connectable at its inlet end to a suitable source of pressure, and tubular means operably connecting said indicating means to the outlet end of said pressure regulator for actuation of said indicating means in step with leakage of said container, said piercing probe assembly including an externally threaded sliding sleeve mounted on said piercing probe and threaded means mounted on said sleeve, said piercing probe slidably fitting said threaded means which is adapted to releasably fasten said threaded sleeve and piercing probe in desired position relative to each other while sealing against leakage between them, said means for anchoring and sealing said piercing probe in place with its piercing end within said container including a multiplicity of jackknife struts wholly within said container and pivotally connected at one end to said piercing probe and at their other end to said externally threaded sliding sleeve, each of said jackknife struts having equal length inner links and equal length outer links, said inner links being moderately longer than said outer links, hinge means joining the adjacent ends of said inner and outer links, whereby when said jackknife struts are wholly within said container, the outward sliding of said probe through said sliding sleeve will project said hinges at the adjacent ends of said inner and outer links in an outward direction with said outer links forming a stop for said piercing probe against the inner face of said carton wall with said inner links bracing said outer links in that position.

3. An apparatus for testing the gas tightness of a flexible wall non-metal container as set forth in claim 2, wherein there is mounted on and closely encircling said threaded sleeve a compressible washer and a threaded nut for forcing said compressible washer against the outer face of said container so as to make a sealed connection between said piercing probe assembly and the wall of said container through which said probe passes.

4. An apparatus for testing the gaseous fluid tightness of a container having at least part of the wall portion of same formed of flexible non-metal material, which comprises the combination of means extending part way through a flexible non-metal wall portion of said container, said means including a piercing probe, a series of jackknife struts, pivot means joining the innermost end of same to the portion of said probe which is inside said container under testing conditions, said probe having grooves for receiving said jackknife struts flat against the side of said probe to facilitate the passage of said piercing probe through said wall portion into testing position, a threaded sleeve closely but slidably fitting said piercing probe and extending substantially full length outside of said container under testing conditions, a packing nut having an inturned outer end and carrying packing in same adjacent said inturned outer end, the inner end of said packing nut being threaded to fit the threaded outer end of said threaded sleeve, said packing nut with its packing being adapted, when tightened, to firmly grip said threaded sleeve and piercing probe in substantially fixed position relative to each other and also seal same against gaseous fluid leakage through the annular space between them, means hingedly connecting said jackknife struts to the inner end of said threaded sleeve, said jackknife struts comprising inner links and outer links with a hinge joining the adjacent ends of same, the inner links of said jackknife struts being all of the same length and the outer links likewise all being of the same length but moderately shorter than said inner links so that when said jackknife struts are buckled outward by pulling said piercing probe back through said threaded sleeve in preparation of the assembly for test use, said outer links will extend outward against the inner face of said container wall and be braced in that position by said longer inner links, said threaded sleeve carrying a compressible rubber-like washer adjacent the outer face of said container wall, and a second nut threadedly engaging said threaded sleeve and tightenable against said compressible washer to bind the latter against said container outer wall to seal against gaseous fluid leakage from said container at this point under testing conditions, a gaseous fluid flow indicating means, means for gas tight connecting the outer end of said piercing probe to said gaseous fluid flow indicating means for gaseous fluid flow therethrough, a source of gaseous fluid under pressure and including a pressure regulator means for delivery of gaseous fluid from said pressure regulator through said gaseous fluid flow indicating means on its way to said container for test purposes, and means for temporarily bypassing said gaseous fluid around said flow indicating means preparatory to testing the gaseous fluid tightness of said container.

5. An apparatus for testing the gaseous fluid tightness of a container having at least part of the wall portion of same formed of flexible non-metal material as set forth in claim 4, wherein said gaseous fluid flow indicating means is adapted to show the gaseous fluid leakage rate of said container under predetermined test pressure, and said gaseous fluid pressure regulator is of adjustable pressure type.

References Cited by the Examiner

UNITED STATES PATENTS

| | | | |
|---|---|---|---|
| 900,324 | 10/1908 | Swangren | 73—49.3 |
| 1,169,691 | 1/1916 | Elmo | 285—210 X |
| 1,297,113 | 3/1919 | Domenico | 73—40 X |
| 2,036,618 | 4/1936 | Benjamin. | |
| 2,403,897 | 7/1946 | Aller | 73—37 X |
| 2,737,803 | 3/1956 | Doudera et al. | 73—52 X |
| 2,853,874 | 9/1958 | Mennesson | 73—40 |
| 2,936,611 | 5/1960 | Le Mat et al. | 73—40 X |
| 2,950,620 | 8/1960 | Magill | 73—102 X |

RICHARD C. QUEISSER, *Primary Examiner.*

ROBERT EVANS, *Examiner.*

E. P. FORGRAVE, G. M. GRON, *Assistant Examiners.*

UNITED STATES PATENT OFFICE
CERTIFICATE OF CORRECTION

Patent No. 3,251,218                                                  May 17, 1966

Paul F. Russell

It is hereby certified that error appears in the above numbered patent requiring correction and that the said Letters Patent should read as corrected below.

Column 1, line 19, for "imersing" read -- immersing --; line 30, for "or", first occurrence, read -- of --; column 5, line 63, for "o" read -- to --; column 8, line 37, after "regulator" insert a comma.

Signed and sealed this 1st day of August 1967.

(SEAL)
Attest:

EDWARD M. FLETCHER, JR.                               EDWARD J. BRENNER
Attesting Officer                                                        Commissioner of Patents